FREQUENCY-DIVIDING CIRCUIT
Filed March 13, 1952
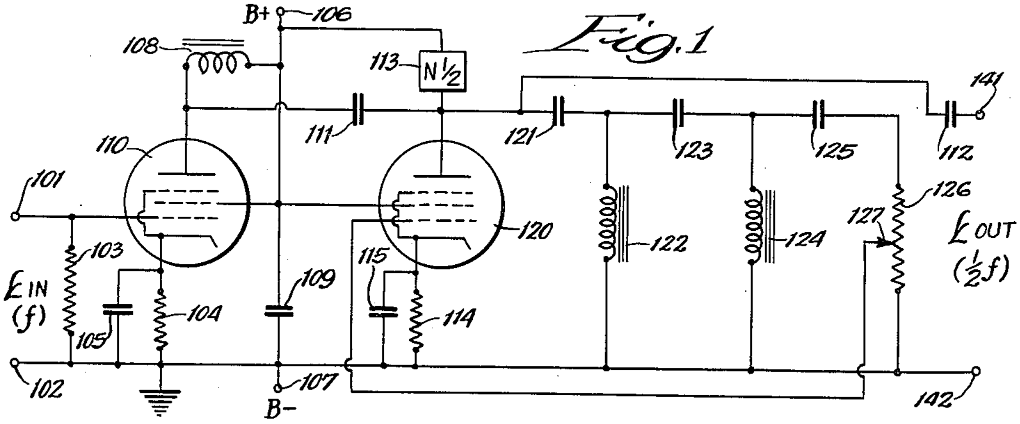
Fig. 1
Fig. 2
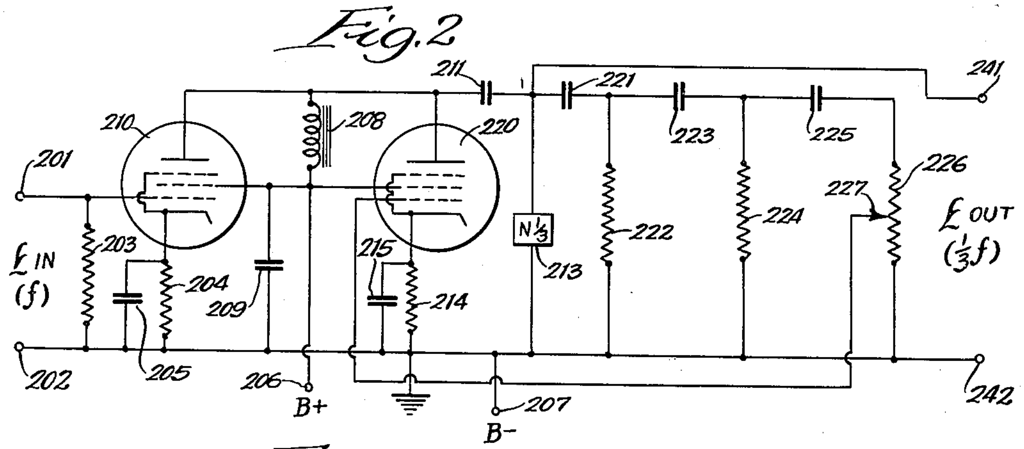
Fig. 3
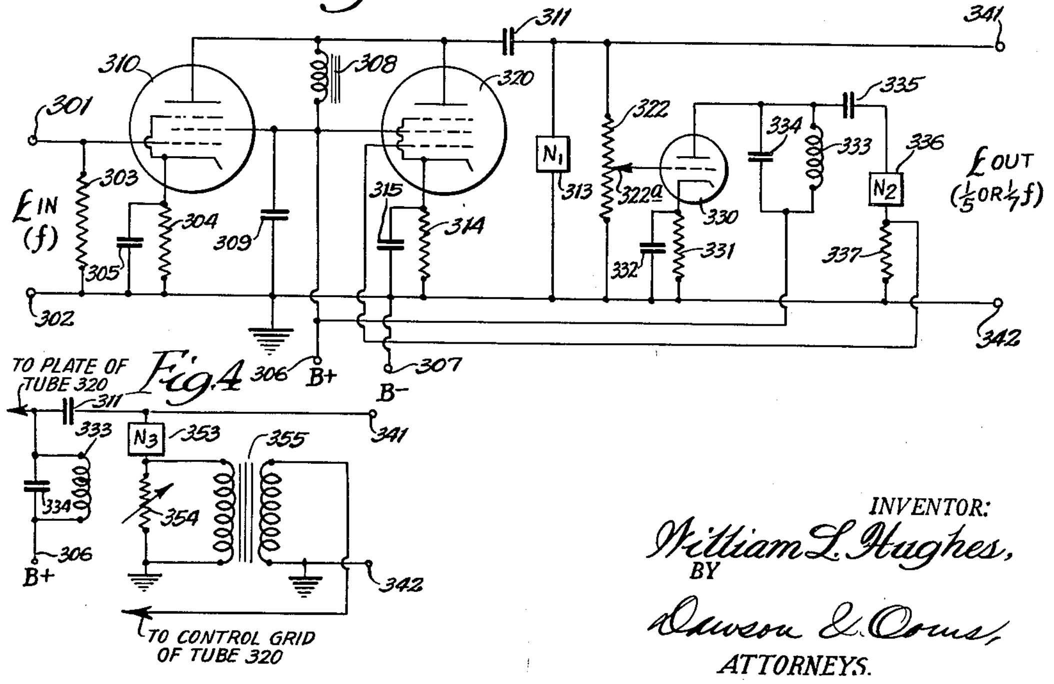
Fig. 4
INVENTOR:
William L. Hughes,
BY
Dawson & Ooms,
ATTORNEYS.

2,739,240

FREQUENCY-DIVIDING CIRCUIT

William Lewis Hughes, Ames, Iowa, assignor to Iowa State College Research Foundation, Inc., Ames, Iowa, a corporation of Iowa Application March 13, 1952, Serial No. 276,272

8 Claims. (Cl. 250—36)

This invention relates to frequency divider circuits, in particular, to divider circuits of the type wherein a locked or synchronized oscillator is employed to generate current of the lower frequency.

Frequency division has many important practical applications, and numerous efforts have been made to develop circuits which would satisfactorily perform that function.

Generally speaking, the great shortcoming of the frequency-dividing circuits found in the prior art has been instability. That has been particularly true of those circuits in which substantially sinusoidal voltages are used for control purposes and are desired as output signals.

Reasonably successful and stable frequency-dividing circuits have been developed in which short-duration pulses were employed as input signals; generally speaking, such circuits have operated on the multi-vibrator or relaxation oscillator principle and have been characterized by an extremely non-sinusoidal output voltage. Consequently, such circuits have required the use of sharply selective filters when employed in applications requiring a sinusoidal output voltage.

The "locked oscillator" has been used on occasion, with sinusoidal input voltage, to generate substantially sinusoidal output voltage having a frequency equal to one-half or one-third of the input voltage. Such oscillators, prior to the present invention, have been highly unstable. They have in general tended to lose synchronization or become "unlocked" as a result of small changes in anode voltage, small changes in the amplitude of the input signal voltage, or small variations in the input signal frequency.

In the present invention, I have discovered a circuit which is free of the many disadvantages which characterized the prior art locked-oscillators, and wherein an input signal can be used to generate an output signal of one-half, one-third, one-fifth, or one-seventh of the frequency of the input signal. The major object of my invention may therefore be said to be the achievement, in a locked oscillator frequency divider, of a high degree of stability and dependable performance independently of changes in the characteristics of biasing voltages, signal input voltage or signal input frequency, within wide limits.

Specifically, I have accomplished this result by devising and employing non-linear circuit elements of a distinctive nature and in a novel manner; thus a further object of my invention may be defined as providing, in a locked oscillator circuit, a non-linear load impedance in which the potential drop is proportional to the square root, cube root, fifth root, or seventh root of the current through it, in accordance with the use of the apparatus to divide the frequency of the applied signal by two, three, five, or seven.

Other objects and advantages of my invention will appear as the specification proceeds.

I have shown schematically in the appended drawing certain illustrative forms of my invention; specifically, Fig. 1 shows a schematic diagram of a locked-oscillator frequency dividing circuit suitable for dividing the input signal frequency by 2; Fig. 2 is a similar schematic diagram showing an apparatus according to my invention for dividing the input signal frequnecy by 3; Fig. 3 is a similra schematic diagram showing an apparatus according to my invention for dividing the input signal frequency by 5 or by 7; and Fig. 4 is a fragmentary schematic diagram showing an alternative form of the Fig. 3 circuit.

I shall first describe the manner of assembly of all of the forms of my invention shown in the drawing, shall set forth typical or illustrative values for the circuit values therein shown, and shall under the heading "Operation" describe the adjustment and operation of the various circuits as used in their respective applications.

Referring first to Fig. 1, I have therein shown a pair of input terminals 101 and 102, to which an input signal voltage may be applied. Input terminal 102 is grounded, and input terminal 101 is connected directly to the control grid of tube 110. A grid resistor 103 is shunted between the control grid of tube 110 and the ground. The cathode of tube 110 is connected internally to the suppressor grid and is connected to ground through bias resistor 104. Resistor 104 is shunted by by-pass capacitor 105.

The voltage supply for the plates and screen grids of the respective tubes is represented by a pair of terminals 106, which is the B+ terminal and 107, which is the B− terminal. It is to be understood that any suitable source of unidirectional voltage may be connected to terminals 106 and 107 with the polarities as indicated. The B− terminal 107 is grounded. B+ terminal 106 is connected through choke coil 108 to the plate of tube 110. The screen grid of tube 110 is connected to B+ terminal 106 and is by-passed to ground by capacitor 109.

Tube 120 may be of the same general type as tube 110; its cathode is also connected internally to its suppressor grid and is connected to ground by bias resistor 114. Resistor 114 is shunted by by-pass capacitor 115. The screen grid of tube 120 is connected to the B+ terminal 106, and the plate of tube 120 is connected to the plate of tube 110 through coupling capacitor 111. The plate of tube 120 is also connected to the B+ terminal 106 through a non-linear impedance to be more fully described hereinafter, which is denoted by the reference numeral 113 and is marked by the legend "$N_{\frac{1}{2}}$." This designation indicates that the circuit element in question is a non-linear resistor in which the potential drop is proportional to the square root of the current through it.

The plate of tube 120 is connected through output coupling capacitor 112 to output terminal 141. The other output terminal 142 is grounded. Connected between the plate of tube 120 and the ground is a three-section reactive network of which the first section comprises the series combination of capacitor 121 and inductor 122. The second section of the reactive network comprises capacitor 123 and inductor 124, connected in series between the junction of elements of 121 and 122, on the one hand, and the ground, on the other hand. To the junction of elements 123 and 124 is connected one terminal of capacitor 125. The other terminal of capacitor 125 is connected to ground through the fixed terminals of potentiometer 126. The movable arm 127 of potentiometer 126 is connected to the control grid of tube 120.

As will be more fully described hereinafter, the circuit shown in Fig. 1 and just described will, when properly adjusted, delivered at the output terminals 141 and 142 a substantially sinusoidal output voltage having the frequency exactly one-half the frequency of the input voltage applied to terminals 101 and 102.

Turning now to Fig. 2, I have shown therein a pair of input terminals 201 and 202, to which the input signal voltage may be applied. Terminal 202 is grounded, and terminal 201 is connected to the control grid of tube 210. Grid resistor 203 is connected between the control grid of tube 210 and ground. The cathode of tube 210 is connected internally to the suppressor grid and is connected to ground through biasing resistor 204. Resistor 204 is shunted by bypass capacitor 205. The screen grid of tube 210 is by-passed to ground by capacitor 209 and is connected to B+ terminal 206. B— terminal 207 is grounded.

The plate of tube 210 is connected directly to the plate of tube 220, and is connected through choke coil 208 to B+ terminal 206.

The screen grid of tube 220 is connected to the screen grid of tube 210. The cathode of tube 220 is connected internally to the suppressor grid and is connected to ground through biasing resistor 214. Resistor 214 is shunted by by-pass capacitor 215.

(Incidentally, I have neither shown nor described in the drawing or specification hereof the detailed circuit connections for heating the cathodes of the various vacuum tubes used. It is to be understood that the heaters of such tubes are to be connected in a conventional manner to a suitable source of heater current.)

One terminal of a non-linear element 213, marked with the legend "$N_{1/3}$" is grounded and the other terminal is connected through coupling capacitor 211 to the plate of tube 220. Output terminal 241 is connected to the junction of element 213 and capacitor 211. Output terminal 242 is grounded.

Non-linear element 213 is a circuit element in which the potential drop is approximately proportional to the cube root of the current through it. I shall describe these characteristics in greater detail in a later paragraph hereof.

A capacitor 221 and a resistor 222 are connected in series between output terminal 241 and ground. A capacitor 223 and a resistor 224 are connected in series between the junction of elements 221 and 222, on the one hand, and ground on the other hand. Similarly, one terminal of capacitor 225 is connected to the junction of elements 223 and 224, while its other terminal is connected to one fixed terminal of potentiometer 226. The other fixed terminal of potentiometer 226 is grounded, and the movable arm 227 is connected to the control grid of tube 220.

The apparatus of Fig. 2, as will be more fully described hereinafter, is operated, when properly adjusted, to deliver an output voltage at terminals 241 and 242 substantially sinusoidal in wave form and exactly one-third the frequency of the input voltage applied to terminals 201 and 202.

I shall now describe the apparatus of Fig. 3, which can be used, with appropriate design of the non-linear elements therein, to generate output voltages having frequencies one-fifth or one-seventh of the frequency of the input voltage.

I have provided a pair of input terminals 301 and 302. Terminal 302 is grounded, and terminal 301 is connected to the control grid of tube 310. Grid resistor 303 is connected between the control grid of tube 310 and the ground.

The cathode of tube 310 is connected internally to its suppressor grid and is connected to ground through biasing resistor 304. Resistor 304 is shunted by by-pass capacitor 305.

The screen grid of tube 310 is by-passed to ground by capacitor 309 and is connected to the B+ terminal 306. The B— terminal 307 is grounded.

The plate of tube 310 is connected to the plate of tube 320 and is also connected to the B+ terminal 306 through choke coil 308.

The screen grid of tube 320 is connected to the screen grid of tube 310. The cathode of tube 320 is connected internally to the suppressor grid and is connected to ground through biasing resistor 314. Resistor 314 is shunted by by-pass capacitor 315.

One terminal of a first non-linear element 313, marked with the legend "$N_1$" is grounded, and the other terminal is connected through coupling capacitor 311 to the plate of tube 320. Non-linear element 313, to be more fully described hereinafter, is a circuit element in which the potential drop is approximately proportional to the fifth root or to the seventh root of the current through it, depending on whether the circuit is being used to divide the frequency of the applied voltage by five or by seven.

Output terminal 341 is connected to the junction of elements 311 and 313, and the other output terminal 342 is grounded.

The fixed terminals of a potentiometer 322 are shunted across non-linear element 313, and the control grid of tube 330 is connected to the movable arm 322*a* of potentiometer 322. The cathode of tube 330 is connected to ground through biasing resistor 331, and resistor 331 is shunted by by-pass capacitor 332.

The plate of tube 330 is connected to the B+ terminal 306 through inductor 333 which, in turn, is shunted by capacitor 334. The constants of elements 333 and 334 should be chosen to make them form a control circuit resonant at the desired output frequency—one-fifth or one-seventh of the input frequency, as the case may be.

The plate of tube 330 is connected through capacitor 335 to one terminal of a second non-linear element 336, marked with the legend "$N_2$." The other terminal of element 336 is connected to ground through resistor 337. The junction of elements 336 and 337 is connected to the control grid of tube 330.

Fig. 4 shows an alternative form of the circuit for dividing by 5 or 7. Also, the circuit of Fig. 4, I have found, will very effectively divide the input frequency by 3 as well.

The alternative circuit of Fig. 4 has the advantage over the circuit of Fig. 3 in that it is somewhat simpler, uses one less tube, and uses one less non-linear element. I have found it fully as satisfactory in performance as the circuit of Fig. 3, and in some respects it is better, since it will permit a larger variation in tube voltages and input frequency without becoming "unloaded."

In the Fig. 4 alternative circuit, the connection between choke coil 308 and the plate of tube 320 is removed and instead the plate of tube 320 is connected to B+ terminal 306 through a parallel resonant circuit comprising capacitor 334 and inductor 333. The plate of tube 320 is also connected through coupling capacitor 311 to one terminal of non-linear element 353, marked with the legend "$N_3$." That same terminal of element 353 is connected to output terminal 341. The other output terminal 342 is grounded.

The other terminal of non-linear element 353 is connected to ground through variable resistor 354, resistor 354 being shunted between primary coil of transformer 355. One terminal of the secondary coil of transformer 355 is grounded and the other terminal is connected to the control grid of tube 320.

It will be understood that in this Fig. 4 form of the invention, tube 330 and its associated parts are not used.

It will be understood, as with most electronic apparatus, that the circuit elements shown and described are subject to substantial ranges of variation in size, depending on the type of tube used, the biasing voltages employed, and the particular performance characteristics desired. Therefore, while I shall in the following paragraphs list typical values for the principal circuit elements in the various forms of the invention shown, it is to be understood that I do not thereby limit the scope of my invention by such listing but merely cite them as typical values which have been found satisfactory in a particular application.

In an installation wherein the input frequency was 10,000 cycles per second, the Fig. 1 circuit was found to perform satisfactorily with circuit elements as follows: tubes 110 and 120, type 6AK5; capacitor 121 and 125, .002 mf.; capacitor 123, .001 mf.; inductors 122 and 124, 0.5 henry; potentiometer 126, 0.5 megohm. Cathode bias resistors 104 and 114 are not critical but may be of the order of a few hundred ohms. The by-pass capacitors 105, 115, and 109 should be large enough to have very low impedance to currents in the higher audio-frequency range. Resistor 103 should be a high resistance, of the order of one-half megohm or more, although its value may be much lower if the voltage source for the input voltage is a low-impedance source. Choke coil 108 may have any desired value so long as its impedance is of the order of several thousand ohms at the frequencies being worked with. The non-linear element 113, having a voltage-current characteristic in which the potential drop across the element was substantially proportional to the square root of the current through it, was made by placing three General Electric Thyrite discs in series. The particular discs used were marked "K–8396832–2."

In the Fig. 2 circuit, used with an input frequency of 15,000 cycles per second, the following values were found saisfactory for the more important circuit elements: tubes 210 and 220, type 6AK5; capacitors 221, 223, and 225, .0001 mf.; resistors 222, 224, and 226, 130,000 ohms. The grid input resistor 203, the cathode bias resistors 204 and 214, the choke coil 208, and the various by-pass capacitors may be within the range of values specified with respect to the corresponding elements in the Fig. 1 circuit.

In the Fig. 3 circuit, the values of elements 303, 304, 305, 309, 308, 314, 315, 311, and 322 may correspond generally to the appropriate values for the correspondingly numbered elements in Fig. 2. Tubes 310 and 320 may be type 6AK5, while tube 330 may be any suitable triode, such as type 6C4 or 6J6. Resistor 331 may be of the order of a few hundred ohms, and by-pass capacitor 332 may have any value large enough to provide a low-impedance by-pass for the frequencies being used. Coupling capacitor 335 is not critical as to capacitance; it may be, for example, .001 mf. or more.

Non-linear element 313, in a typical successful embodiment of the invention, was a single Western Electric varistor type D156709. Non-linear element 336 was made up of four type D156709 varistors in series with one another. In that embodiment, resistor 337 was 2200 ohms.

The constants of elements 334 and 333 will of course be chosen to provide resonance at the desired output frequency.

In the Fig. 4 embodiment of the invention, the non-linear element 353 was a single varistor type D156709, and resistor 354 was a resistor variable between 0 and 500 ohms. Transformer 355 may be any good transformer approximating ideal characteristics for the frequency in use.

It will of course be understood that the circuit constants given in the foregoing paragraph are purely for purposes of illustration rather than of limitation. Generally speaking, the linear elements are not critical in their values, and the non-linear elements may vary in characteristics considerably so long as their voltage-current characteristics conform generally to the appropriate shape—that is, so long as the voltage is substantially proportional to the square root, cube root, fifth root, or seventh root of the current, as the case may be.

The similarity in shape of the fifth-root characteristic and the seventh-root characteristic is sufficiently great to make possible the use of a single non-linear element or set of non-linear elements for division by either five or seven. That is, I find that either the Fig. 3 circuit or the Fig. 4 circuit can be changed from division by five or division by seven merely by changing the constants of elements 334 and 333, rather than requiring substitutions as well of new non-linear elements.

Incidentally, either capacitor 334 or inductor 333 may be made variable over a convenient range of values to facilitate exact adjustment to the resonant frequency desired.

*Operation*

The frequency dividing circuits herein disclosed are remarkably stable and easy to adjust. A suitable voltage source should be connected to the input terminals, and the feedback control (resistor 126, 226, 322, or 354, respectively) should be adjusted to substantially the middle of the range within which a stable output voltage at the desired fractional frequency is obtained at the output terminals. Properly adjusted, these circuits are so stable that the input voltage can be varied in amplitude over a range of more than 10 to 1 and the input frequency may be varied over a range of plus or minus 10% without disturbing the synchronization. Similarly, the anode voltages for the various tubes in the circuits of Figs. 1, 2, and 4 can be varied over a range of 4 to 1 without affecting the synchronization. The circuit of Fig. 3 is somewhat more critical as to anode voltage changes; while it will operate successfully over a wide range of anode voltages, a change of more than 5 or 10% in the anode voltage will usually require a slight readjustment of the feedback control.

To divide the input frequency by an even number, such as 2 or 4, it is preferable that there be a D. C. component of current through the non-linear element, such a component adding substantially to the stability of operation. It is for that reason that Fig. 1 shows element 113 connected in a part of the circuit where it carries not only the alternating component of anode current from tube 120, but also the D. C. component of that tube's anode current. It is to be understood that the circuit arrangement shown is purely illustrative, and any other desired method of providing a D. C. component of current through element 113 may be used.

When dividing the input frequency by an odd number, no D. C. component of current through the non-linear element is necessary or appropriate, and accordingly the circuits of Figs. 2, 3, and 4 show the non-linear element isolated from D. C.

The theoretical explanation for the desirability of a D. C. component in the non-linear element when dividing by an even number lies in the trigonometric identities which relate a given angle to its half-angle or double angle. Those identities involve a constant term which is lacking from the corresponding identities which relate an angle to its odd multiples or fractions. The D. C. anode current passing through element 113 provides the electrical analog for that constant term.

Even without a D. C. component of current in the non-linear element, my invention will divide an input frequency by an even integer with far more stability than conventional circuits; the addition of the D. C. component of current in the non-linear element does, however, contribute substantially to the good performance of the invention when dividing by even integers.

It is believed that the foregoing material provides an adequate description of the invention so that those skilled in the art will be readily able to practice the same. It may be stated in summary, however, that the general operating characteristics of the circuits illustrated in Figs. 1 through 4 and that have hereinbefore been described are frequency-divider circuits of the locked oscillator type. In locked oscillator frequency dividers, an oscillator circuit is provided and the circuit components are chosen and arranged so that the natural frequency of oscillation has the desired value. The frequency of the oscillator thus provided is locked by an input signal. All oscillator frequency dividers of this general type are normally very unstable. Where the input or locking signal is a series of pulses, the stability though still unstable has been much better than where the input or locking signal (the signal having a frequency to be divided) has been a periodic sinusoidal wave.

Taking the circuit of Fig. 1 as a specific illustration, although it should be understood that the general description to be given applies to the remaining circuits illustrated in Figs. 2 through 4, the electron discharge tube 120 and the inductance-capacitance phase shifting circuits provided by the capacitors 121, 123 and 125 and the inductances 122 and 124, provide an oscillatory circuit having a natural frequency of oscillation determined primarily by the values of the circuit components. In this circuit a signal is taken by the tap 127 from the potentiometer 126 and is fed back to the control grid of the tube 120. This oscillator is locked by the input signal having a frequency ($f$) that is applied to tube 120 through tube 110 and the connecting circuits illustrated. The input frequency ($f$) is a periodic sinusoidal wave, and in the usual locked oscillator frequency divider the output would be very unstable. However, in the present arrangement it has been found that the non-linear element 113 is operative to stabilize the frequency divider so that variation in the frequency of the input signal, variation in the voltage of the input signal, and variation in the supply voltage for the circuit, all over wide ranges, would not result in appreciable deviation in the output frequency of the circuit. Specifically in the circuit illustrated in Fig. 1, the input frequency ($f$) is to be divided so that the output signal has a frequency that is one-half of the input frequency. In such an arrangement the non-linear element 113 is chosen so that the potential drop thereacross is proportional to the square root of the current flowing through it.

While I have in the present specification described in considerable detail several specific circuits for the practice of my invention, it will be understood that those are illustrative only, and that many changes and departures therefrom may be made by persons skilled in the art without departing from the spirit of my invention. It is accordingly my desire that the scope of my invention be determined primarily by reference to the appended claims.

I claim:

1. Apparatus for dividing by an even integer the frequency of an applied periodic voltage comprising an electron discharge device having an anode, a cathode, and a control element, a non-linear element connected in the anode circuit of said electron discharge device and positioned to carry at least a portion of the alternating component of anode current thereof, means for superimposing on said alternating current component in said non-linear element a unidirectional component of current, feedback means connecting said anode and said control element operative to apply to said control element a part of the voltage drop across said non-linear element, input means adapted to receive a periodic input voltage, and means channeling through said non-linear element a periodic current controlled by said input voltage, said non-linear element having a voltage-current characteristic in which the voltage across the same is substantially proportional to that integral root of the current through it corresponding to the integer by which the frequency of the input voltage is to be divided.

2. Apparatus according to claim 1 wherein said feedback means comprises a phase-shifting network.

3. Apparatus for dividing by an integer the frequency of an applied periodic voltage, comprising a control device having a control element, an external non-linear element connected in circuit with the output of said control device and being arranged to carry at least a portion of the alternating component of the output current thereof, means for superimposing on said alternating current component in said external non-linear element a unidirectional component of current, feed-back means connecting the output of said control device and said control element and being operative to apply to said control element a part of the voltage drop across said external non-linear element, input means adapted to receive a periodic input voltage and means channeling through said non-linear element, a periodic current controlled by said input voltage, said non-linear element having a voltage-current characteristic in which the voltage across the same is substantially proportional to that integral root of the current through it corresponding to the integer by which the frequency of the input voltage is to be divided.

4. Apparatus for dividing the frequency of an applied periodic voltage, comprising a control device having a control element, an external non-linear element connected in circuit with the output of said control device and being arranged to carry at least a portion of the alternating component of the output current thereof, feed-back means connecting the output of said control device and said control element and being operative to apply to said control element a part of the voltage drop across the external non-linear element, input means adapted to receive a periodic input voltage, and means channeling through said non-linear element a periodic current controlled by said input voltage, said external non-linear element having a voltage-current characteristic in which the voltage across the same is substantially proportional to that root of the current through it corresponding to the number by which the frequency input voltage is to be divided.

5. A frequency divider circuit, comprising a control device having a control element and an output circuit, an external non-linear impedance element in the output circuit of said control device, feed-back means connected between said output circuit and said control element and being operatively arranged to apply to said control element a portion of the voltage drop across said external non-linear element, input means adapted to receive a periodic input voltage, and means coupling said input means to said external non-linear element operative to send through that element a current controlled by said input voltage.

6. Apparatus according to claim 5 wherein said external non-linear element possesses a voltage-current characteristic such that the voltage thereacross is substantially proportional to an integral root of the current through it.

7. Apparatus according to claim 6 wherein said feedback means comprises a frequency-selective circuit resonant to the frequency related to the input frequency by the fraction which is the reciprocal of the numerical order of the aforesaid root.

8. A frequency divider, comprising an electrical energy source having a control element and an output circuit, an external passive element in the output circuit of said source and having a preselected non-linearity of substantially greater magnitude than any non-linearity possessed by said electrical energy source, feed-back means comprising a phase shifting network coupling said external element with said control element, means responsive to a periodic input voltage and being connected to said external element for applying thereto a current controlled by the input voltage, and output means coupled to said external element for receiving therefrom an output frequency of sub-integral ratio to the frequency of said input voltage.

References Cited in the file of this patent

UNITED STATES PATENTS

| | | |
|---|---|---|
| 2,159,597 | Miller | May 23, 1939 |
| 2,568,533 | Artzt | Sept. 18, 1951 |

OTHER REFERENCES

"Frequency division with phase-shift oscillators" by Charles R. Schmidt, from June 1950 issue of "Electronics," pages 111–113.